(No Model.)  L. P. JACOBSEN.  2 Sheets—Sheet 1.
KNEADING MACHINE.

No. 553,162.  Patented Jan. 14, 1896.

WITNESSES:
H. V. Suess
E. J. Schmit

INVENTOR
Lars P. Jacobsen
BY C. W. Suess.
ATTORNEY.

(No Model.) 2 Sheets—Sheet 2.
L. P. JACOBSEN.
KNEADING MACHINE.
No. 553,162. Patented Jan. 14, 1896.
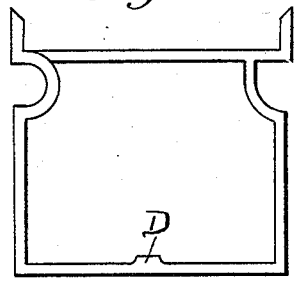
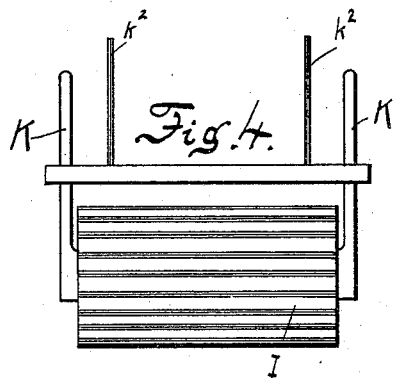
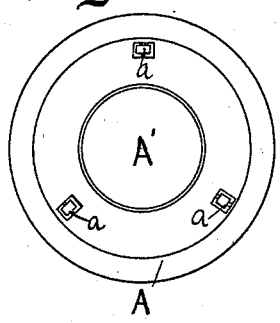
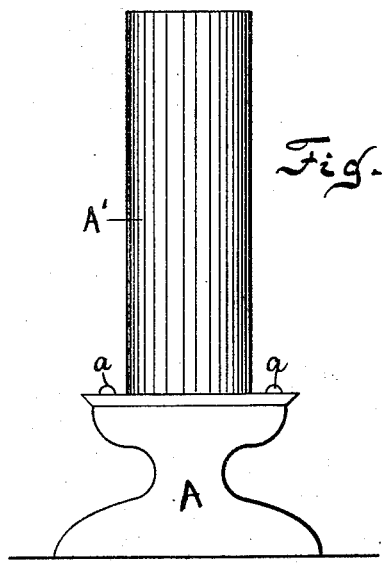
WITNESSES:
Lars P. Jacobsen
INVENTOR
BY
ATTORNEY.

UNITED STATES PATENT OFFICE.

LARS P. JACOBSEN, OF MONTPELIER, IDAHO.

KNEADING-MACHINE.

SPECIFICATION forming part of Letters Patent No. 553,162, dated January 14, 1896.

Application filed August 28, 1893. Serial No. 484,267. (No model.)

*To all whom it may concern:*

Be it known that I, LARS P. JACOBSEN, of Montpelier, in the county of Bear Lake and State of Idaho, have invented certain useful Improvements in Kneading-Machines; and I do hereby declare that the following is a full, clear, and exact description of the invention, such as will enable others skilled in the art to which it appertains to make and use the same, reference being had to the accompanying drawings, which form a part of this specification.

This invention has relation to a novel dough and butter kneading machine, the object being to provide a device that shall be adapted to be used by the families, as well as dairymen and bakers.

Figure 1:
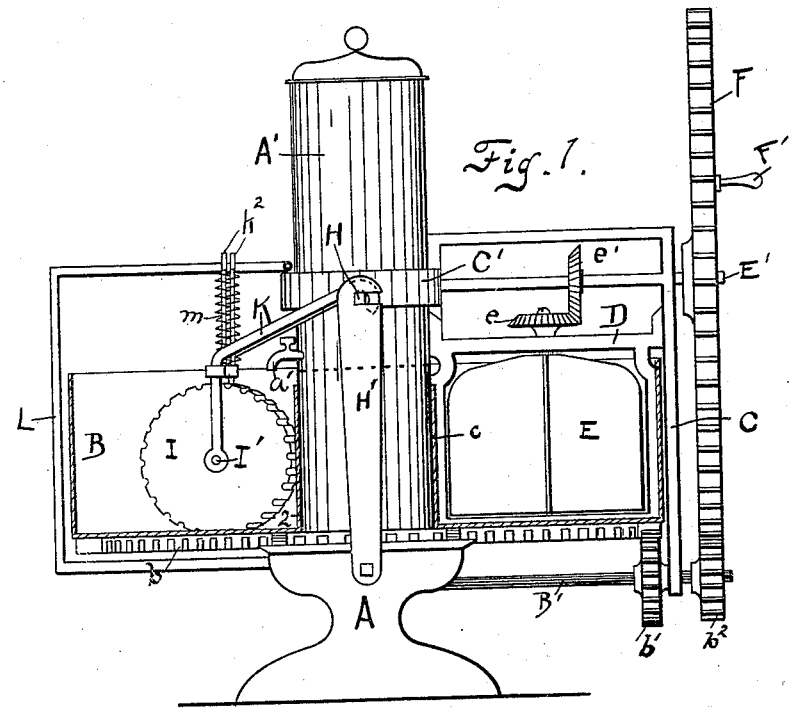
Figure 2:
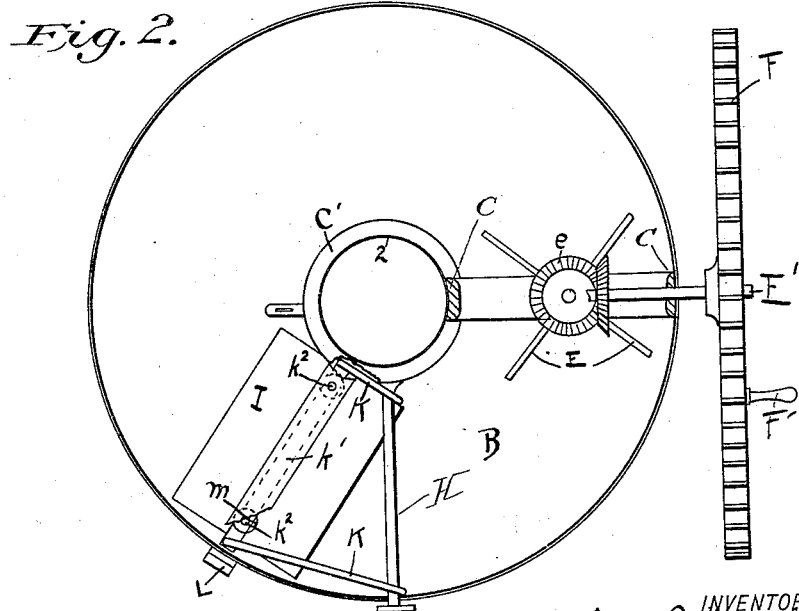

In the accompanying drawings, Figure 1 shows a sectional elevation, with parts broken away, of my improved kneader. Fig. 2 is a top view of Fig. 1. Fig. 3 is a side elevation of the paddle-supporting frame. Fig. 4 is a front view of the kneading-roll. Fig. 5 is a top view of the standing reservoir, while Fig. 6 is a detailed view of the stand and reservoir-cylinder.

A is an ordinary iron supporting-standard, which is provided upon the top with the cylindrical reservoir A', which forms part thereof. This standard upon the top is preferably cylindrical, and is provided with three antifriction and supporting rolls marked $a$, and shown in Figs. 5 and 6. The cylindrical reservoir is provided with a stop-cock $a'$, and has a bottom a short distance below said stopcock, so that the upper half of said cylinder may be used as a water-reservoir. Surrounding this reservoir A' and working upon the rolls $a$ is the drum-shaped trough B, provided below with the crowned rack $b$. This trough works loosely about the cylindrical reservoir A' and upon the rolls $a$. Centrally this drum is provided with a circular opening, within which the cylindrical reservoir A' is held. Extending from this circular opening is the cylindrical collar $c$, extending upward a suitable distance so as to form a water-tight trough, through the center of which the cylinder A' extends, as shown. Extending from the lower standard, A, is the main driving-shaft B' provided with the gears $b'$ $b^2$. This shaft B' is supported from above by means of the angular brace-bar C, which is secured to the adjustable collar C' working upon the cylindrical reservoir A', as illustrated. The gear $b'$ is adapted to mesh with the crowned rack $b$ and so impart a rotary movement to the trough B. Working within this trough is the rectangular supporting-frame D, (shown in Fig. 3,) which is secured at its upper end to the collar C' and the angle-bar C. The edges of this frame D are partially rounded and adapted to slide and work snugly against the inner surfaces, both at the bottom and the sides of the trough B, as will be more clearly understood by referring to Fig. 2. This frame D is stationary, and is provided interiorly with the paddles E working vertically and rotating within the frame. These paddles are provided with a central shaft, to the upper projecting end of which is attached the crown-gear $e$ meshing with the corresponding crown-gear $e'$ which is fixed to the driving-shaft E', the shaft E' being horizontally secured within the rectangular supporting-frame D and the collar C'. To the outer projecting end of the shaft E' is secured the driving-gear F, which meshes with the lower gear, $b^2$, of the shaft B', and is operated by means of the handle F'.

Extending horizontally from the collar C' is the supporting-bar H, which is held at its free end by means of the pivoted vertically-held supporting-bar H', which latter bar is provided with a slot within which the horizontal supporting-bar H is held, as will be understood by referring to Figs. 1 and 2.

I represents my kneading-roll, the cylindrical surface of which is preferably corrugated and which works snugly within the trough B. The roll is of a suitable size and is provided with a central shaft I', to which are secured the two hooked trailing arms K, the upper hooked ends of which pass over bar H and so detachably secure the roll I to said bar H.

Extending over and beyond the roll I is the rectangular supporting-bar L, which is secured at its lower end to the standard A. The hooked trailing arms K are secured by means of a transverse brace $k'$, of wood, which is provided with the two upwardly-extending rods $k^2$, which latter rods $k^2$ pass through suitable openings of the rectangular supporting-bar L, and so connect said kneading-roll I to this angular bar.

$m\ m$ represent suitable coil-springs, which are mounted upon the rods $k^2$, and at the upper ends press beneath the angular bar L, so as always to force the roll I tight upon the bottom of the trough.

Now when all the parts have been properly constructed and arranged, the operation of my device would be as follows: As the main gear F is revolved it rotates the connected gear $b^2$ and so imparts a rotary motion to the gear $b'$, and as a result works the crown-gear $b$ and so imparts a rotary motion to the trough. At the same time the shaft E would have been revolved and so have imparted a rotary motion to the paddles E, which would revolve in a vertical plane, the frame D at the same time scraping upon the bottom and the sides of the trough. This would be necessary, as the dough or butter which it is intended to work would have a tendency to cling to the trough, and so is cleared by this frame D. If desired, the paddles E may be provided with suitable openings so that the material could work through them as said paddles revolve. After having passed between these paddles the material will of course be carried by the rotating trough to the spring-actuated kneading-roll I, where it would again be worked, and escaping this it would be carried without agitation to the paddles E, where it would be again worked, and escaping this would of course again pass under the kneading-roll, and so the operation would be continued. If any water would be required for the dough or it would be necessary to wash the butter, the stop-cock $a'$ could be used to supply the water. Of course, if desired, in the working of the dough the kneading-roll I could be readily detached, as it would be simply necessary to swing the supporting-bar H' downward, unlocking the bar H, which is held within the siding of the collar C', whence said bar H could be removed and the kneading-roll carried from under the bar L.

The device is simple and can be operated by one person.

Having thus described my said invention, what I claim as new, and desire to secure by United States Letters Patent, is—

1. In a kneading machine the combination with a suitable supporting standard having a cylindrical reservoir connected thereto, of a cylindrical trough mounted about said reservoir provided with a crown gear, an operating gear meshing with said crown gear, a scraping frame within said trough provided with agitating paddles, a driving shaft provided with gears to operate said paddles, a driving gear for operating said crown gear, and a spring actuated kneading roll working within said trough and detachably secured thereto, all substantially as and for the purpose set forth.

2. In a kneading machine, the combination with a supporting standard A provided with a cylindrical reservoir A' having the stop cock $a'$ and the trough, B, having the crown gear, $b$, secured to the under side thereof and working about said reservoir, A', of the shaft B', provided with the gear $b'$ and $b^2$ meshing respectively with the crown gear $b$ and the gear F, the adjustable collar C', the supporting frame C, secured thereto the driving shaft E' provided with the crown gear $e'$, the frame D working within said trough and provided with the paddles E, said paddles being provided with the crown gear $e$, all arranged substantially as and for the purpose set forth.

3. The combination with the standard A, of the reservoir A' provided with the stop cock $a$, of the trough B provided with crown gear $b$ and the operating shaft B' and gear $b'$ meshing with said crown gear, of the supporting rod H secured by means of the vertical bar H', the corrugated kneading roll I secured to said bar H by means of the trailing arms K, the brace bar $k'$ provided with the rods $k^2$, and the springs $m$ adapted to work against the supporting bar L, all arranged to operate substantially as and for the purpose set forth.

In testimony whereof I affix my signature in presence of two witnesses.

LARS P. JACOBSEN.

Witnesses:
G. W. SUES,
F. B. RODEFER.